(12) United States Patent
Zhu et al.

(10) Patent No.: US 6,226,373 B1
(45) Date of Patent: *May 1, 2001

(54) INTELLIGENT SERVICE PERIPHERAL/ INTELLIGENT PERIPHERAL

(75) Inventors: Yao T. Zhu; Daniel Luu, both of Plano; Thomas W. Rekieta, McKinney; Hu Shen, Plano, all of TX (US)

(73) Assignee: Alcatel USA Sourcing, L.P., Plano, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,490

(22) Filed: Jul. 1, 1998

Related U.S. Application Data

(60) Provisional application No. 60/051,734, filed on Jul. 3, 1997, and provisional application No. 60/052,636, filed on Jul. 16, 1997.

(51) Int. Cl.$^7$ ...................................................... H04M 3/42
(52) U.S. Cl. .......................................... 379/207; 379/219
(58) Field of Search ................................... 379/207, 219, 379/220, 229, 230; 370/351, 358, 360, 400, 422

(56) References Cited

U.S. PATENT DOCUMENTS

| 5,461,669 | 10/1995 | Vilain | 379/350 |
|---|---|---|---|
| 5,469,500 | * 11/1995 | Satter et al. | 379/207 |
| 5,508,707 | * 4/1996 | LeBlanc et al. | 342/457 |
| 5,583,920 | * 12/1996 | Wheeler, Jr. | 379/207 |
| 5,664,102 | * 9/1997 | Faynberg | 379/207 |
| 5,732,130 | * 3/1998 | Iapalucci et al. | 379/207 |
| 5,838,768 | * 11/1998 | Sumar et al. | 379/230 |
| 5,889,848 | * 3/1999 | Cookson | 379/207 |
| 6,122,352 | * 9/2000 | Kangas et al. | 379/114 |

* cited by examiner

*Primary Examiner*—Ahmad Matar
*Assistant Examiner*—Benny Q. Tieu
(74) *Attorney, Agent, or Firm*—Anderson, Levine & Lintel, L.L.P

(57) ABSTRACT

An ISP 10 provides enhanced features compatible with non-AIN switches to allow service providers to provide customers with features such as voice prompting, DTMF number collection, fax on demand and similar features. In one embodiment, the ISP can also be configured as an IP. Enhanced features can be accomplished using the ISP, such as advanced routing of long distance calls based on ANI, authorization codes, type of call, time of day, origination of call and destination of call.

18 Claims, 9 Drawing Sheets

INTELLIGENT SERVICE PERIPHERAL/ INTELLIGENT PERIPHERAL

CROSS-REFERENCE TO RELATED APPLICATIONS

This application claims the benefit of the filing date of provisional application U.S. Ser. No. 60/051,734, filed Jul. 3, 1997, entitled "Intelligent Service Peripheral/Intelligent peripheral" to Zhu et al and to U.S. Ser. No. 60/052,636, filed Jul. 16, 1997, entitled "Intelligent Service Peripheral/ Intelligent peripheral" to Zhu et al.

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to devices for providing enhanced services.

2. Description on the Related Art

The features provided by telecommunications over the last decade has been rapidly increasing. While in past years the telephone network was solely dedicated to providing connections between phones, today's telephone network provides many enhanced services to facilitate communications. Such features include voice mail, call forwarding, caller ID, fax on demand, voice response services and many others.

The ability to provide enhanced features has come largely from the emergence of AIN (Advanced Intelligent Network). In order to connect to the AIN, intelligent AIN-compatible switches are used.

While there is significant enthusiasm to provide the enhanced features supported by the AIN, the cost of providing these features can be prohibitive, since telephone service providers have a significant investment in older, non-AIN compatible switches. These switches mainly set up and tear down phone calls and do not support connection to the AIN.

Accordingly, the need has arisen for a technology to provide enhanced services in conjunction with existing non-AIN compatible switches.

BRIEF SUMMARY OF THE INVENTION

In the present invention, an electronic device for providing enhanced telecommunication functions, comprises circuitry for providing a switching service function communicating with external switches and translating externally received signals into an independent internal protocol and for providing specialized resource functions. An internal service control function may be provided by the circuitry or the circuitry may be configured to couple to an external service control peripheral.

The present invention provides significant advantages over the prior art. The device may be configured as an IP to operate in a number of different circumstances. Using an internal protocol independent of the external protocol(s) to communicate between subsystems of the IP allows the device to be easily modified and expanded as circumstances require. The IP can be configured with an SCF to provide a complete service node.

DETAILED DESCRIPTION OF THE INVENTION

The present invention is best understood in relation to FIGS. 1–12 of the drawings, like numerals being used for like elements of the various drawings.

Figure 1:
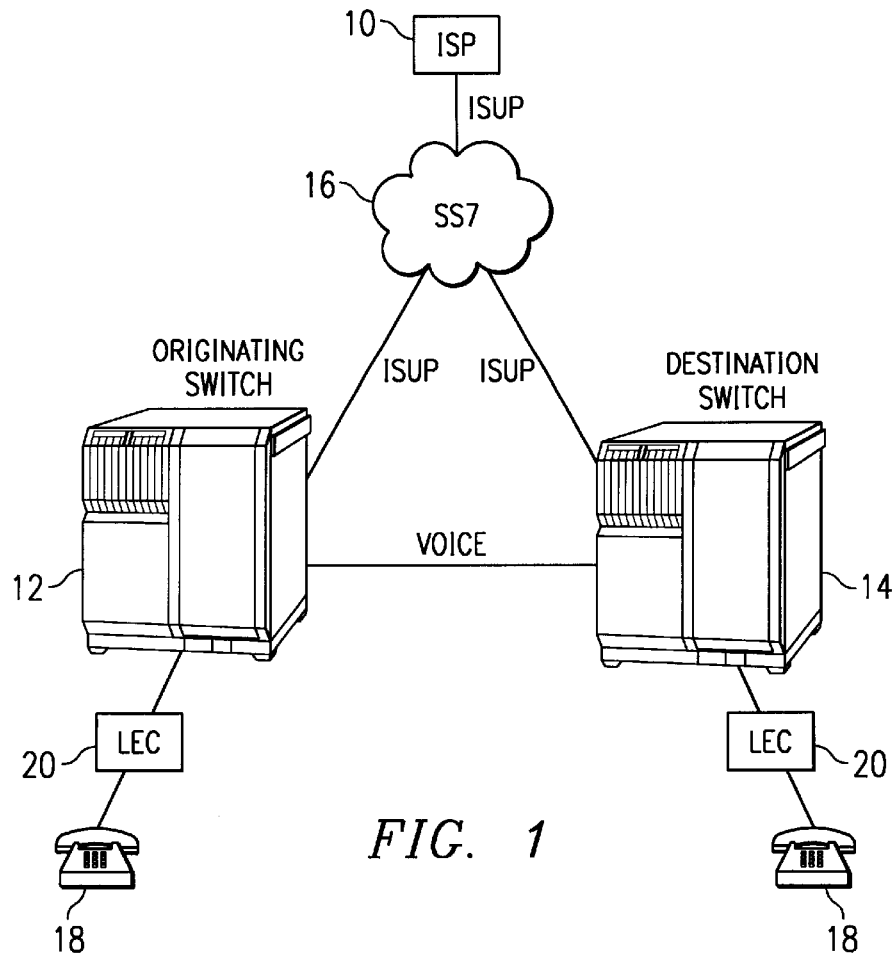
FIG. 1 illustrates a block diagram of an ISP used in a communications system.

FIG. 1 illustrates a first embodiment of an ISP (Intelligent Service Peripheral) which allows enhanced services using non-AIN switches, such as a DSC DEX 600 switch (by DSC Communications Corporation of Dallas, Tex.). In this embodiment, the ISP 10 is connected to a non-AIN switch 12 (along with other switches 14, which may be either AIN or non-AIN switches) through the SS7 network 16. User devices, such as phones 18, are connected to the switches 12 and 14 through LECs (Local Exchange Carriers) 20.

The ISP 10 allows a service provider to provide enhanced features to its customers. In normal operation (without ISP 10), a calling party connected to a non-AIN switch 12 enters the number indicating a called party and the voice connection is set up between the originating and destination switches by the SS7 layer 16 in response to the number. Features such as interactive voice prompting for additional information are not normally available over the non-AIN switch 12.

The ISP 10 overcomes many of the limitations of the non-AIN switch 12. Phone numbers associated with enhanced features are set in the non-AIN switch 12 to connect with ISP 10. The ISP 10 can then process the call using an internal application program as appropriate based on the phone number of the called party. For example, for a given phone number, the ISP 10 could return a connection path to the non-AIN switch 12 information based on the ANI (automatic number identification) received by the ISP 10 from the non-AIN switch 12. This would be useful, for example, if a company wanted to connect a customer to the nearest service location based on the customers area code. In another example, the ISP 10 could use voice prompts to receive a PIN (personal identification number) from the calling party.

Figure 2:
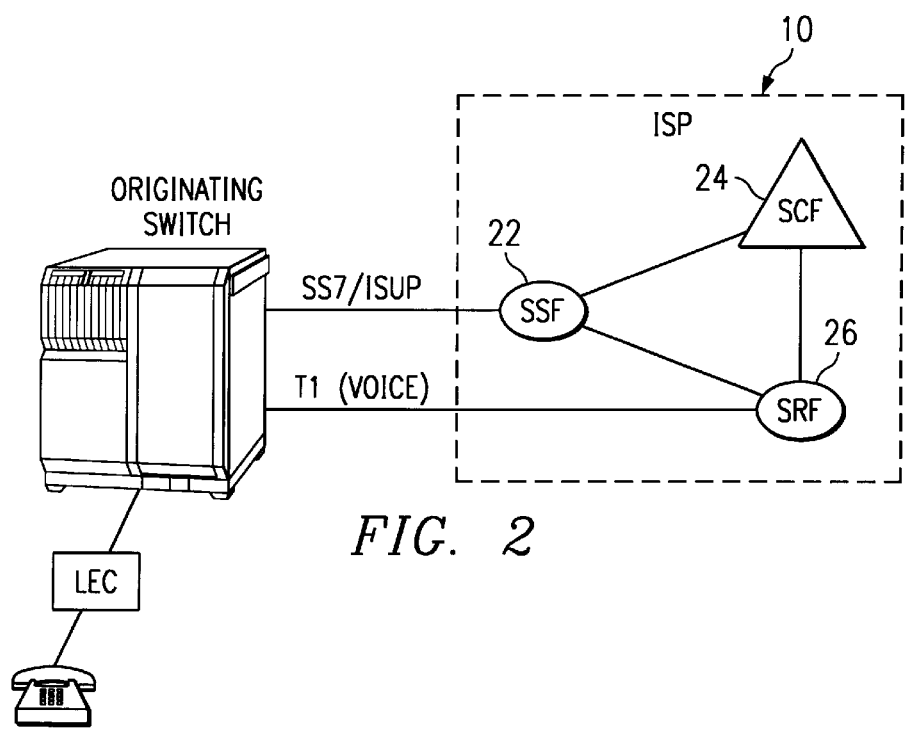
FIG. 2 illustrates a block diagram of a logical view of the ISP of FIG. 1.

FIG. 2 illustrates a first embodiment of a logical structure for the ISP 10. An SSF (service switching function) 22 is connected to the non-AIN switch 12 (through the SS7 layer 16). The SSF is coupled to the SCF (service control function) 24 and to the SRF (specialized resource function) 26. The SCF 22 is coupled to the SRF 26. The SSF 22 is responsible for communicating with the non-AIN switch 12 and the SCF 24. The SSF is also responsible for connecting the calling part to a resource located in the SRF 26 at the request of the SCF 24. The SSF can be implemented similarly to a SSP (service switching point).

The SCF 24 receives messages from the SSF 22, executes SLPs (service logic programs) and sends messages to the SSF 22. The SCF 22 also communicates with the SRF 26 to provide instructions when the SRF 26 is interacting with a user. The SCF 24 can be implemented by an SCP (a service control point, which is commonly used in the SS7 network for providing a database) and a SLI (service language interpreter, for interpreting SLP instructions to implement the enhanced features).

The SRF provides resources such as voice announcements, DTMF (dual tone multifrequency) digit collection, and other multimedia functions.

Figure 3:
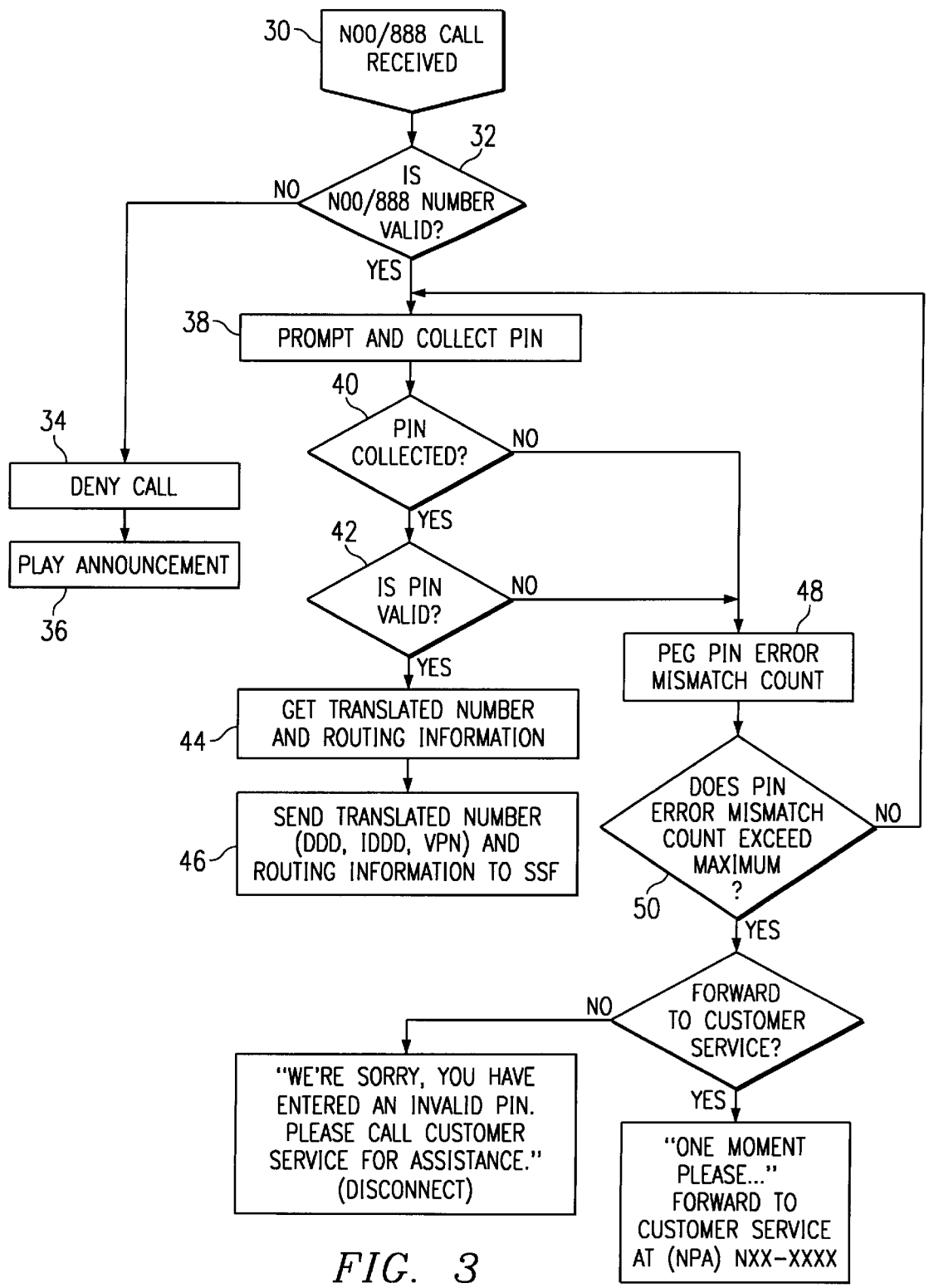
FIG. 3 illustrates a flow chart of a service which could be provided by the ISP.

FIG. 3 illustrates an example of the use of the ISP 10 to provide enhanced functionality compatible with non-AIN switches. In this example, SAC (service access code) translation (N00/888) with PIN service is demonstrated. An incoming call (ISUP/SS7) is received by the SSF 22 from the non-AIN switch 12 (block 30). The SAC number is sent from the non-AIN switch 12 to the SCF 24 for validation. If the number is invalid in decision block 32, the call is denied in block 34 and the SCF 24 instructs the SRF 26 to play an announcement corresponding to the denial in block 36. If the call is valid in decision block 32, the SRF 26 is instructed by the SCF 24 to prompt the user for PIN numbers and collect the DTMF digits from the user in block 38. Once a PIN is collected in decision block 40 and is valid in decision block 42, the SCF 24 looks up the translated number and generates routing information in block 44. In block 46, the translated number and routing information is sent by the SSF 22 to the non-AIN switch 12, which completes the connection to the proper destination switch 14.

If a proper PIN is not collected in block 40 or if a valid PIN is not collected in block 42, an error procedure is invoked. In blocks 48 and 50, the user is given a predetermined number of attempts to provide a proper and valid PIN. Once the predetermined number of attempts is passed, the user is either forwarded to customer service (using the SRF 26 to announce the forwarding step and the SCP to generate the connection information for completing the connection at the non-AIN switch 12) or an error message is generated by the SRF 26 indicating the proper number to call.

Figure 4:
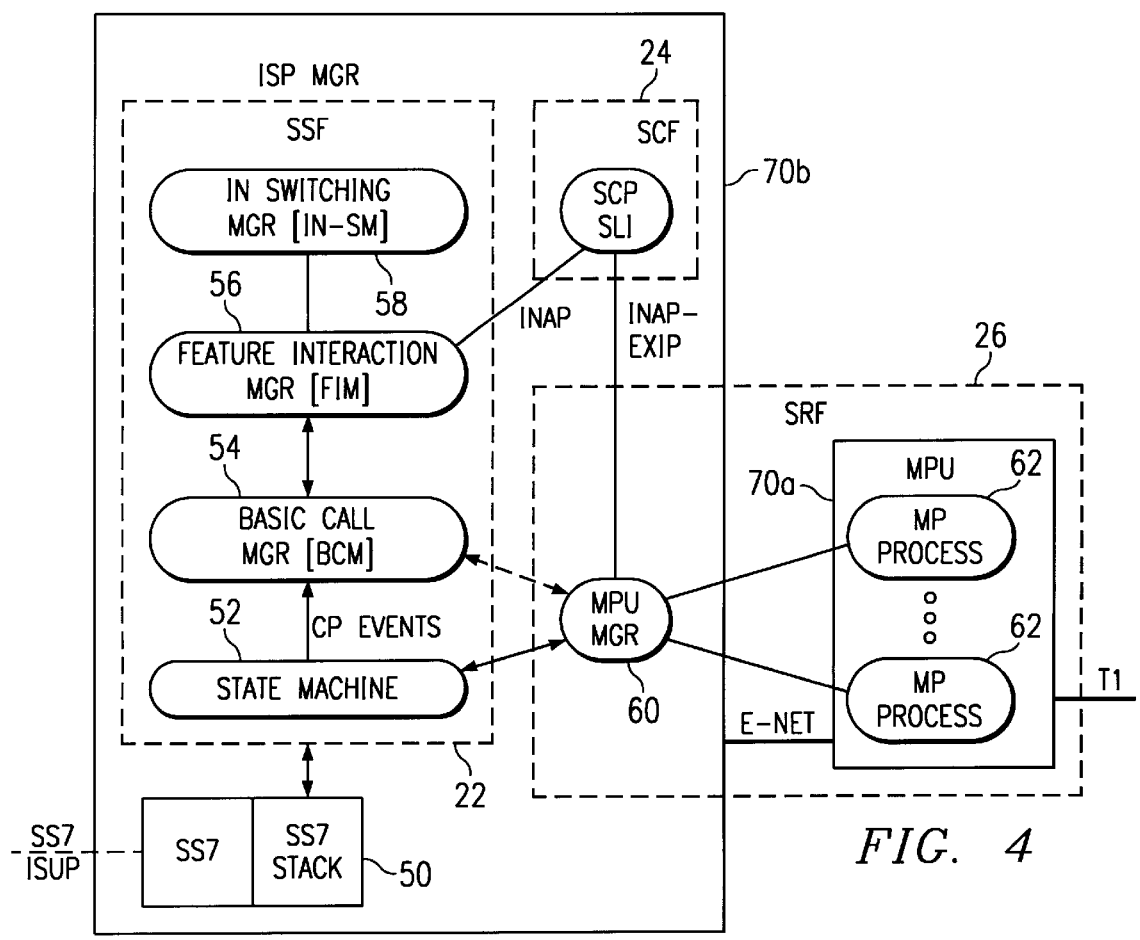
FIG. 4 illustrates a detailed block diagram of the ISP of FIG. 2.

FIG. 4 illustrates a specific embodiment of the ISP 10, using dual SUN SOLARIS computers. It should be noted that the allocation of processes between computers shown in FIG. 4 is for illustrative purposes only; the number of computers used in a particular SSF 22 can vary upon the power of the computer and the desired capacity and complexity of the specialized resources.

The SS7/ISUP data stream from a non-AIN switch 12 is received at the SS7 stack 50. The SS7 stack 50 is connected to the SSF 22, which includes state machine 52, BCM (Basic Call Manager) 54, FIM (Feature Interaction Manager) 56 and IN-SM (IN Switching Manager) 58. The SCF 24 is connected to the SSF through the FIM 56 and to the SRF 26 through a MPU (multimedia processing unit) Manager 60. The BCM 54 and the state machine 52 of the SSF 22 are also in communication with the MPU Manager 60. In addition to the MPU Manager 60, the SRF contains one or more multimedia processes (MPs) 62. The MPs 62 execute the various features provided by the SRF 26, such as announcement capability and DTMF digit collection. In the illustrated embodiment, the MPs 62 are executed by a first computer 70*a* and the remaining functions of the ISP 10 are executed by a second computer 70*b*.

The SS7 stack 50 provides an SS7 interface including MTP1, MPT2, MPT3 and ISUP layers for the ISP 10. The SS7 interface encodes and decodes the ISUP messages to and from the non-AIN switch 12.

Figure 5:
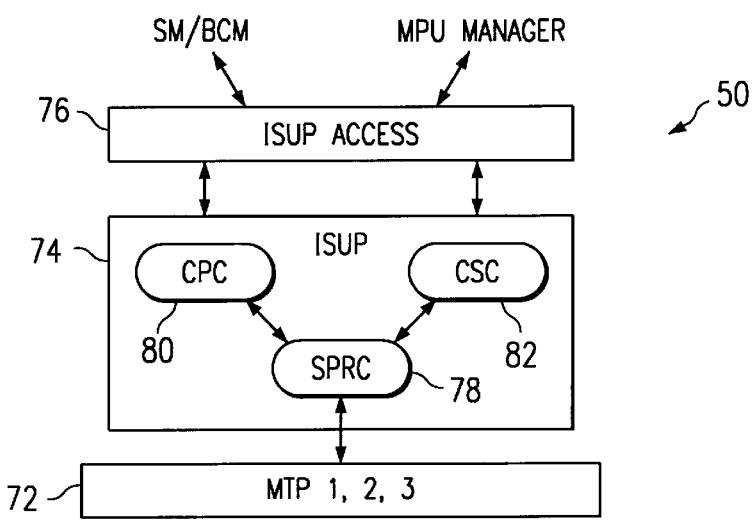
FIG. 5 illustrates a block diagram of an SS7 stack of FIG. 4.

The SS7 stack 50 is divided into three main functional areas as shown in connection with FIG. 5: an MTP1,2,3 layer 72, and ISUP layer 74 and an ISUP access layer 76. The ISUP layer 74 is divided into three functional areas: a SPRC (signaling procedure control) area 78 provides forward and backward message distribution procedures, a CPC (call processing control) area 80 provides basic circuit switched service procedures and a CSC (circuit supervision control) area 82 provides circuit maintenance and recovery procedures.

The ISUP Access layer 76 converts the ISUP message to/from signal independent C++ messages and transfers the messages to the state machine 52/BCM 54 and the MPU Manager 60.

The SSF 22 includes the state machine 52 for processing service requests. The state machine 52 tracks the state transitions for a service request as it is processed by the various components of ISP 10. The state machine 52 assigns a transaction ID to the service request and saves any information need to process the request in a call control instance. BCM 54 provides basic call modeling for the protocol associated with each service request message. FIM 56 determines which SCF features are associated with each service request. The IN-SM 58 routes service requests to the SCF 24 and MPU Manager 60.

The SSF 22 receives ISUP service request messages from the SS7 interface and controls the call processing and messaging between the SSF 22, SCF 24, the SRF 26, and the SS7 stack 50. SSF processing begins with an ISUP service related message received over the SS7 link and converted to a C++ object including SS7 header information. SSF 22 performs the following call processing related functions:

1) Assign a transaction ID (TID) and save the incoming Initial Address Message (IAM) in a Call Control Instance (CCI) to be used for all SSF processing of the call. The CCI is also used for call status/history and making SS7 reply messages to the Origination Point Code (OPC) in the non-AIN switch 12.

2) Validate any trunk circuit (CIC) assignment made by the OPC for voice path connection to an MPU trunk circuit. This will insure that the trunk circuit is idle and operational. A direct call will be made to an MPU interface library to check the trunk status for idle an mark it busy for processing a call.

3) Send an ACM (address complete message) message to the non-AIN switch 12 to establish the bearer channel connection to the SRF 26.

4) Determine which SCF-provided service is requested by the ISUP service request and convert the service request to an INAP "Initial Detection Point" (IDP) message with the SCP service key. After sending the IDP message to the SCF, the SSF will then place the call in the IDP state and start a timeout to insure SCF completion of this request. The service request is also time-stamped with a beginning "Start of Message" (SOM) time.

When the SCP receives the IDP message, it will process the IDP message and sends back one of the following INAP messages to the SSF:

1) "Connect", indicating call service completion to a Called Party ID. The SLP may provide a call completion index which will point to a routing table in Sybase (or other network). In this case, the SSF 22 will retrieve the routing table and package it in the ISUP connect message sent to the non-AIN switch 12.

2) "Release Call" (RC)

3) "Play Announcement" (PA)

4) "Play Announcement and Collect Digits"(PAC)

If SSF receives "Release Call" from the SCP, then SSF will send all ISUP "Release trunk"(REL) message hack to the non-AIN switch 12 and terminate call processing. If "Connect" is received, then the SSF sends an ISUP RLT to the non-AIN switch 12 and terminates call processing.

At any time during call processing, the SSF 22 can receive a "Release Trunk" (REL) message from the non-AIN switch 12 which will result in a UABORT message sent to the SCP and MP along with the necessary Transaction ID and Trunk Circuit Code. The SSF completes UABORT by sending a RLC back to the non-AIN switch 12

The SSF 22 accesses ISUP call service requests through an ISUP C++ message object which provides interfaces for getting and setting message parameters. SSF 22 will capture all origination information necessary to generate a reply to the non-AIN switch 12 switch.

The SSF 22 will be able to access trunk status through the MPU Manager interface.

The SSF 22 has access to a trigger point database which allows translation of ISUP service requests to the internal service key used to access an SCP service. In the preferred embodiment, the SSF 22 supports an MMI interface which displays summary call statistics and individual call status for system debug purposes. The SSF call status includes a summary history of messaging between the SSF, SCP, and MPU. In addition, total call processing time for each call in the history buffer is maintained. System TRACE messages plays all messages that are received and sent by SSF 22 along with their call processing state transitions.

The State Machine object provides the interface to the ISUP access for sending and receiving ISUP messages. It captures the Call Control Instance associated with a service request, validates the circuit assignment for the service notifies the MPU, and forwards the ISUP request to the INMGR.

The Call Control Instance (CCI) provides storage and coordination between the SM, INMGR and MPU for service processing. The CCI includes the following:

1) ISUP Interface object from the ISUP interface

2) Transaction ID

3) State Control

4) INAP Call Model for SCP interface

5) CIC and non-AIN switch OPC

The IN-SM 58 Calls SSM (Service Specific Mapper) to map service specific parameters from ISUP to INAP and provides the SSF/INAP Call Model. The IN-SM 58 determines which INAP message sequence to expect for interfacing to the SCP and provides state control, timeout and transitioning for the INAP messages to/from the SCP.

Service Specific Mapping (SSM) determines what SLP will handle the service, provides parameter mapping between ISUP and INAP, and performs local database access for generating routing tables and information which cannot be handled by the INAP/SLP connect message.

The MPU Manger 60 receives INAP MPU service request messages from the SCF 24 and the SSF 22. In addition, it maintains the trunk database and processes trunk maintenance messages. The responsibilities of the MPU manager 60 include:

1) Receive INAP instructions to play an announcement and/or play announcement and collect digits;

2) Send collected digits an/or appropriate INAP response back to the requester.

3) Upon receiving instructions to play announcement and/or collect digits, the MPU manager 60 determines which MP will handle the request. It then informs the appropriate MP to perform the action. The MPU manager 60 also times the action to verify the MP sends back the appropriate results. If a time-out occurs, the MPU manager issues the appropriate message back to the requester stating the error.

4) Receive circuit management messages indicating a CIC Assigned, CIC Released, CIC In-Use, CIC Blocked, CIC Unblocked, and CIC Reset. Upon, receiving these messages, the MPU manager 60 modifies the appropriate trunk status accordingly in the trunk database.

5) Receive trouble notifications from the MPs and issue the appropriate IPRs (Information Problem Report). If changes or updates to the trunk database are necessary, it will make the changes and inform the network of the blocked circuits.

6) Convert CIC into the appropriate span and circuit identifier for the trunk database.

7) Convert span and circuit ID into the appropriate CIC.

8) Provide a craftsperson with the appropriate tool to configure the trunks into the appropriate trunk groups.

Upon receipt of CIC-Assigned, MPU manager 60 will do the following:

Convert CIC code into appropriate Span and circuit number.

Mark Span-circuit BUSY in trunk database.

Upon receipt of CIC-In Use, MPU manager 60 will do file following:

Convert CIC code into appropriate Span and circuit number.

Mark Span-circuit IDLE in trunk database.

Issue "Connect" request for the affected Circuit to file appropriate MPU process.

Send an ARI message to the SCP to request instructions.

Set timer to wait for response to ARI (or time-out).

Upon receipt of CIC-Release, MPU manager 60 will do file following:

Convert CIC code into appropriate Span and circuit number.

Stop timer for any transactions pending associated with file affected circuit.

Send a "Disconnect" request for file affected circuit to file appropriate MPU process.

Mark Span-circuit IDLE (or OOS if in a BLOCK state) in trunk database.

Upon receipt of Play Announcement message, MPU manager 60 will do the following:

Convert CIC code into appropriate Span and circuit number.

Send "Play Announcement" request to appropriate MPU process.

Set timer to wait for "Play Announcement" response from MPU or time-out.

Upon receipt of Prompt and Collect User Information message, MPU manager 60 will do the following:

Convert CIC code into appropriate Span and circuit number.

Send "Prompt and Collect" request to appropriate MPU process.

Set timer to wait for "PAC" response from MPU or time-out.

Upon receipt of "Play Announcement" response from MPU, MPU manager 60 will do the following:

Stop the timer for the response message.

Format and send the Specialized Resource Report message to the SCP.

Upon receipt of "PAC" response from MPU, MPU manager 60 will do the following:

Stop the timer for the response message.

Format and send the Collected User Information message to the SCP.

Upon timeout of "Play Announcement" or "PAC" response from MPU, MPU manager 60 will do the following:

Format and send the appropriate NAP message back to the SCP with an error indication.

Upon timeout of "ARI" response from SCP, MPU manager 60 will do the following:

Format and send another ARI message.

Upon receipt of "Play Announcement" or "Prompt and Collect User Information" CANCEL message, MPU manager 60 will do the following:

Convert CIC code into appropriate Span and circuit number.

Send "Cancel" request to appropriate MPU process.

Set timer to wait for "Cancel" response from MPU or time-out.

The embodiment shown in FIGS. 1–5 allows non-AIN switches to take advantage of enhanced features. By mapping the call set-up/release ISUP protocol to TCAP message based INAP, the ISP 10 can take advantage of AIN products, such as SCEs, SMSs and SCPs for service creation, service deployment, database systems, service provisioning and so on.

FIGS. 6–10 illustrate an embodiment of a device which can be configured as either as an ISP 10, complete with SSF, SCF and SRF capabilities, or as a Network IP (intelligent peripheral), without the SCF. The ability to configure the device as either a ISP or an IP allows greater flexibility in configuring a device to the needs of a customer.

Figure 6:
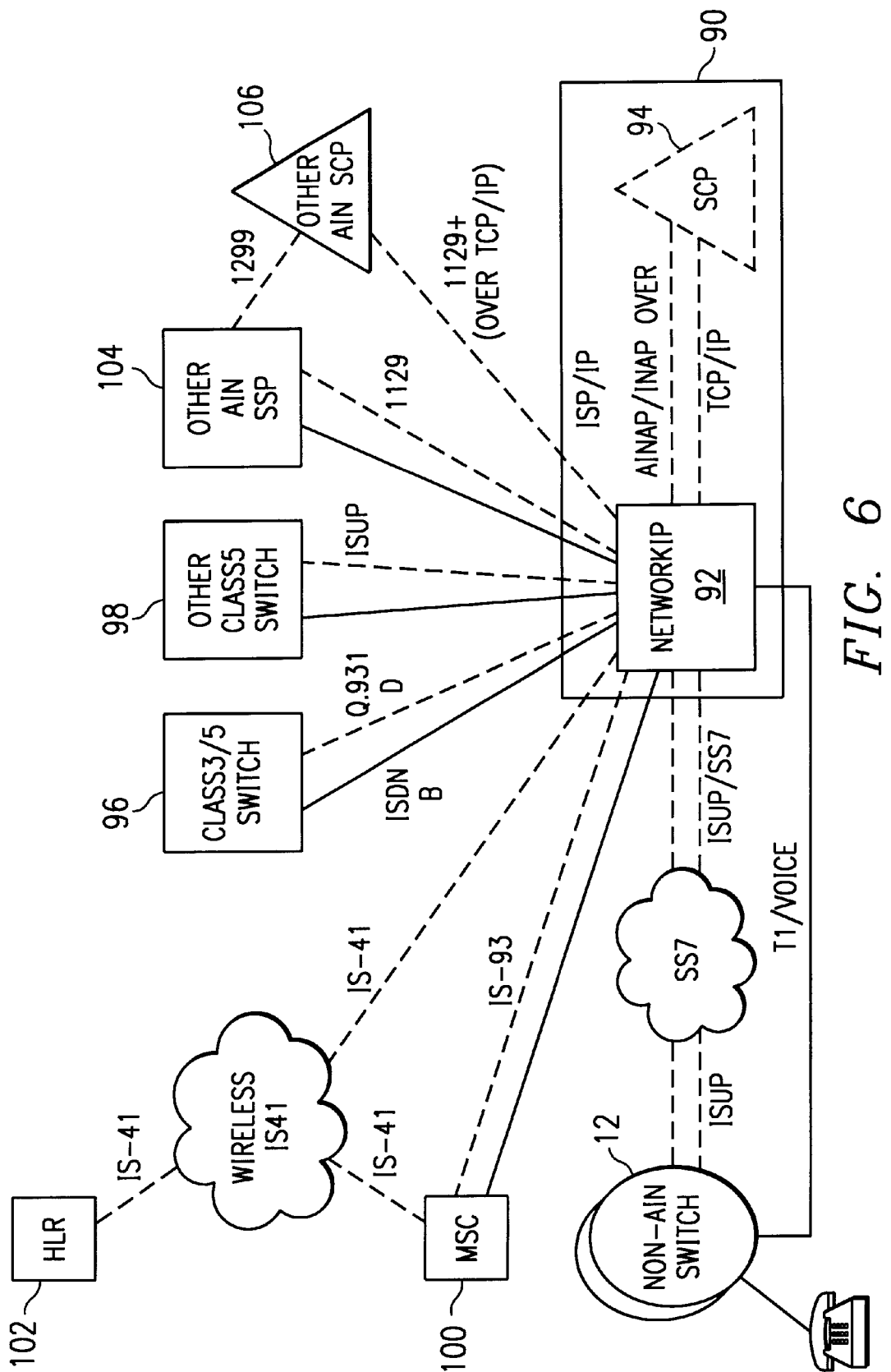
FIG. 6 illustrates an ISP which can also be configured as an Network IP.

FIG. 6 illustrates a block diagram of an ISP/IP 90, along with connections to a variety of devices. In most circumstances, the ISP/IP 90 would be connected to some, but not all of the devices shown. Further, the ISP/IP 90 could be connected to other devices by providing a suitable interface, as discussed below.

As shown in FIG. 6, the ISP/IP 90 comprises a NetworkIP 92 and an SCP 94. The NetworkIP 92 implements the SSF and SRF functions described above. The SCP 94 implements the SCF functions. The ISP/IP 90 can be used with the SCP 94 as an ISP, or without the SCP 94 as just the NetworkIP 92.

As described above, the ISP/IP 90, through the NetworkIP 92 can be connected to a non-AIN switch 12 using a ISUP/SS7 connection for signaling and a T1 connection for audio transmissions from the SRF. Additionally, in the preferred embodiment, the NetworkIP 92 could be connected to other switches, such as Class 3/5 switches 96, other Class 5 switches 98 or to a wireless system including a MSC (Mobile Switch Center, a switch for the wireless system) 100 and a HLR (home location register, roughly equivalent to an SCP for the wireless system) 102. The NetworkIP 92 could also be connected to other AIN SSPs 104 or to an AIN SCP 106.

The flexibility of the ISP/IP 90 allows a vendor to use a single hardware platform to provide solutions to various customer needs. Further, a customer with a need for specialized functions in a variety of situations can use ISP/IPs 90 in a variety of situations, simplifying maintenance problems associated with having separate devices for each situation.

For example, if a customer already has purchased an SCP and would like to add DTMF digit collection capabilities to a non-AIN switch 12, that customer can purchase the NetworkIP 92, rather than the entire ISP with the SCP, thereby saving cost. Further, that customer can purchase other ISP/IPs 90 for connection to other switches in its communications network. The customer gains by reducing the number of different hardware platforms in its system, and the vendor gains by reducing the engineering effort needed to address a customer's particular needs.

As with the embodiment of FIGS. 1–5, the ISP subsystems can be implemented using multiple computers coupled by a network, or by a single computer. The number of computers needed for an application will depend upon the power of the computer and the number and complexity of the enhanced features supported by the ISP.

Figure 7:
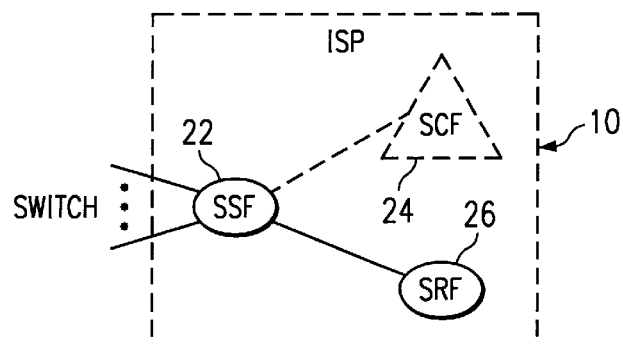
FIG. 7 illustrates a logical diagram of the ISP of FIG. 6.

A block diagram of the ISP/IP 90 is shown in FIG. 7. The ISP/IP 90, when configured as an ISP includes an SSF 22, SCF 24 and an SRF 26. However, the components of the ISP/IP 90 are configured slightly differently from the ISP 10 of FIG. 2. In the embodiment of FIG. 7, the SRF 26 is not directly coupled to the SCF 24. Accordingly, instructions for the SRF 26 come from the SSF 22.

The configuration shown in FIG. 7 allows the ISP/IP 90 to operate as a NetworkIP 92 when the SCF function is not provided in the ISP/IP 90.

Figure 8:
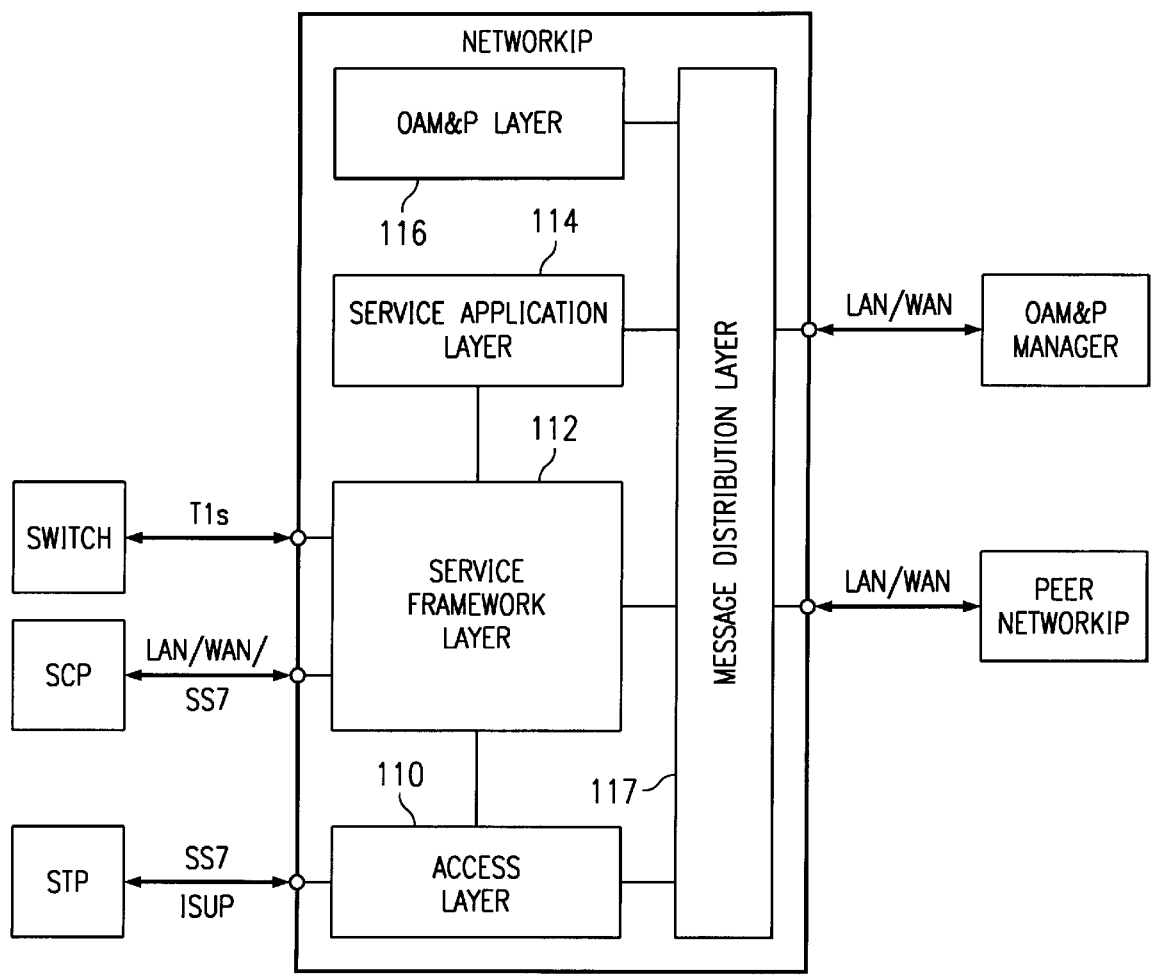
FIG. 8 illustrates a block diagram of the software layers of the Network IP.
Figure 9:
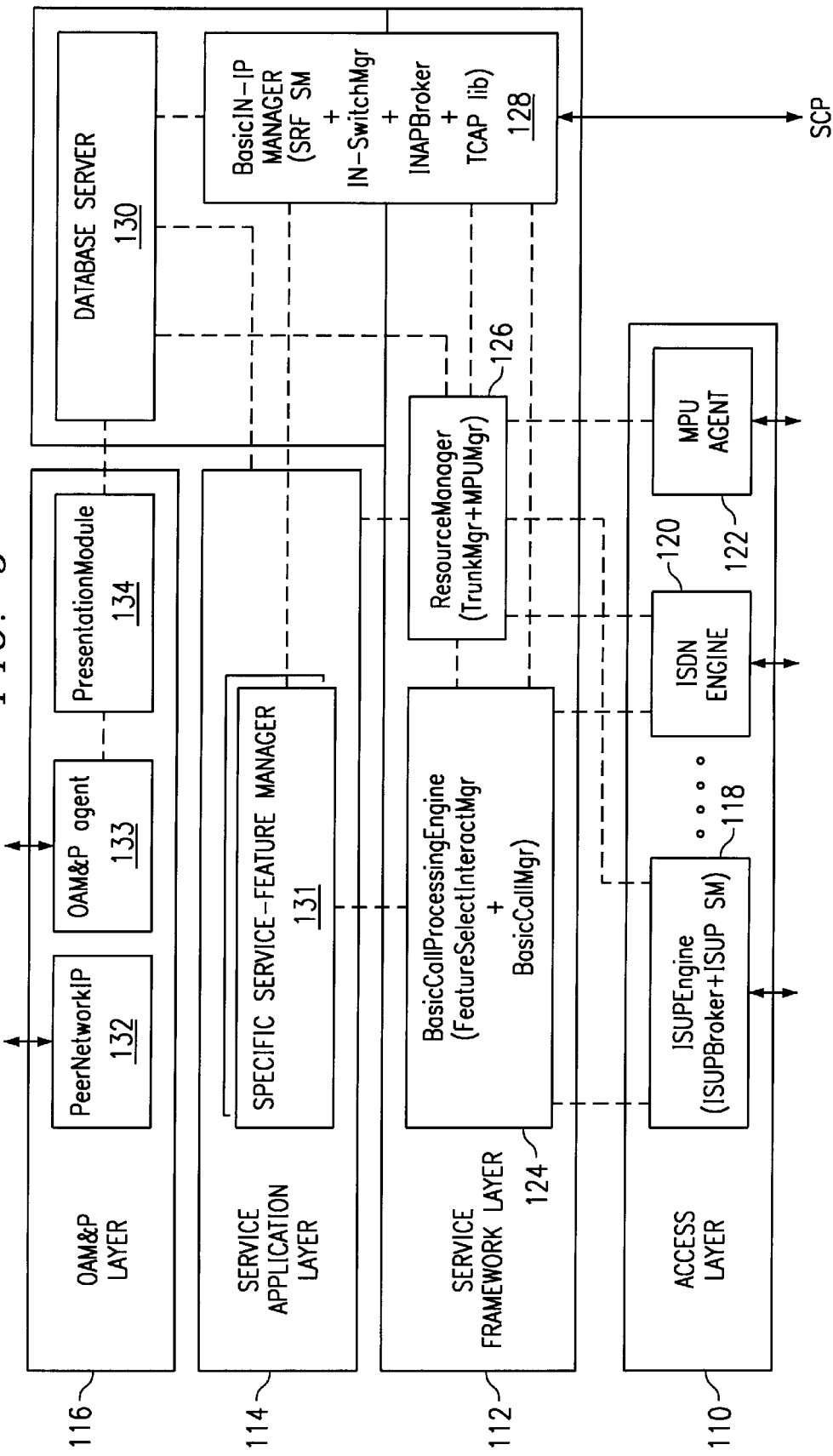
FIG. 9 illustrates a detailed block diagram for the software layers shown in FIG. 8.

FIG. 8 illustrates a logical software architectural view of the ISP/IP 90. Four layers are shown: an access layer 110, a service framework layer 112, a service application layer 114, and an OAM & P (Operation, Administration, Maintenance, and Provisioning) layer 116. FIG. 9 illustrates each layer in greater detail. Within the access layer 110, three subsystems are shown: an ISUP Engine 118, an ISDN engine 120, and one or more MPU Agents 122. In the service framework layer 112, four subsystems are shown: a Basic Call Processing Engine 124, a Resource Manager 126, a Basic IN-IP Manager 128 and a Database Server 130. The service application layer may comprise one or more Specific Service Feature Managers 131 for each feature provided. The OAM&P layer 116 comprises a PeerNetworkIP 132, an OAM&P Agent 133 and a Presentation Module 134. It should be noted that other subsystems could be provided at each layer, depending upon the functionality desired for a specific design. With reference to FIGS. 8 and 9, the layers that house the NetworkIP subsystems are described below:

The Access Layer 110 contains subsystems that provide access to external networks. This includes the signaling network access and media access for specialized resource handling. These subsystems contain logical component called ProtocolBroker to perform adaptation functions to convert the various external protocol format to an internal universal format. ProtocolBrokers are intermediate agents to hide the various specific protocol interface to the rest of the components of the NetworkIP system because they adapt/convert from different protocol messages to an internal universal messages. The Protocols mentioned here are for both call setup related protocols such as ISUP, ISDN, and IS-93, and TCAP related protocols such as INAP, AINAP, and IS-41.

The Service Framework Layer contains subsystems that provide the basic call processing, resource handling, and message distribution capabilities. This framework layer is the foundation for the NetworkIP 92 to build upon to provide various service features. New service-features can be added by re-using the same infra structure offered by the framework as the previous service feature uses. In addition, the framework layer could support Voice/Data Interworking and Data Gateway functionality. The Voice/Data Interworking function provides the interworking between voice related service and data service. It is a conversion and bridging service such as the voiceband modem pool being used to deposit a custom short message by the caller's computer dial-up connection to a subscriber that is handled by a Short Message Service Message Center (a NetworkIP specific service feature Application Entity). The Data Gateway function provides data access to data networks. This could be Internet e-mail, Web Feature-Manager on top of Frame Relay network, SMDS, ATM, X.25 networks, CDPD networks, and other networks.

Database Server 130 handles database related transactions to access data. BasicCallProcessingEngine 124 handles Basic Call State Model for both Originating Call Segment and Terminating Call Segment. The BasicCallProcessingEngine 124 provides a common context for call processing in the NetworkIP system. ResourceManager 126 handles both specialized resource and regular resource handling on the behalf of the other components within the NetworkIP system. The examples of specialized resources are DTMF digit collection, announcements, and so on, and the regular resources can be listed as circuit, trunk group assignment management, among others. BasicIN-IP Manager 128 handles IN-IP related transactions and interfaces to SCP/HLR.

The Service Application Layer 114 contains subsystems that provide specific service features that the NetworkIP 92 supports. These subsystems utilize the core capabilities of the Service Framework Layer 112 to accomplish its goals.

The OAM&P Layer 116 provides several functions. These can be listed as statistic collection, event report, IPR, logging, alarm management, fault management, configuration management, subscriber and service update, billing, craft interface and similar functions. The OAM&P Layer 116 also provides housekeeping functions such as back-up, usage monitoring, and diagnostics and provides cooperation with external manager to carry out the OAM&P functionality as an agent by interacting with Network Operation/Management Center. In addition, the OMAP layer 116 interfaces with the SCE (service creation environment) for service logic deployments that are supported by the NetworkIP system.

A low level communication called Message Distribution Layer 117 is treated as an embedded layer that allows messages to be exchanged among the entities within NetworkIP system.

Figure 10:
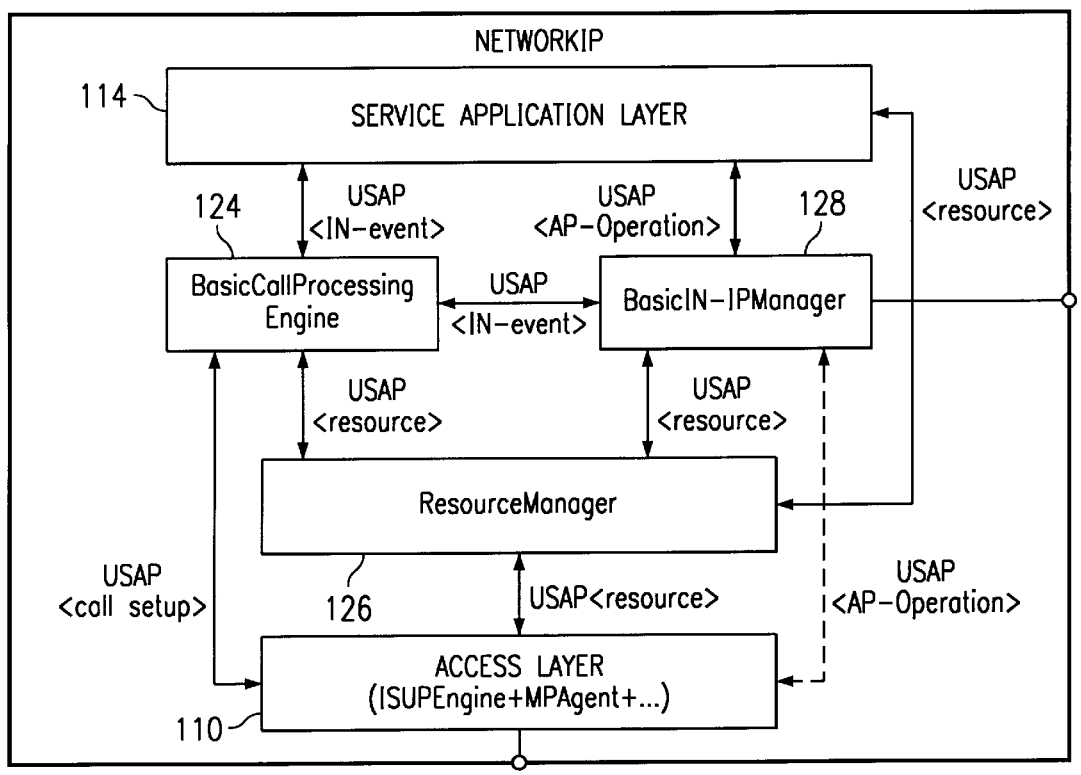
FIG. 10 illustrates the communications between subsystems in the Network IP.

FIG. 10 illustrates a block diagram describing the interfaces among the Network IP subsystems at the application level shown in FIG. 9. For illustration purposes, this figure excludes the OAM&P layer 16 and low level components.

The NetworkIP 92 is designed to accept various protocols, as shown in FIG. 6. However, within the NetworkIP 92, a universal protocol (i.e., not dependent upon an external protocol) is used. A particular universal internal protocol is described herein, the Universal Service Application Protocol (USAP). USAP is an internal connectionless object oriented application protocol to allow NetworkIP subsystems to exchange messages to each other. In one embodiment, the USAP is composed of a header followed by binary variable length data to contain the structured data of a particular message object. The USAP transports the object data as binary data where the receiver retrieves the binary data to initialize the object that is referred in the header. The receiver pre-fabricates these objects, which are called vacant objects. The vacant objects become alive when they are initialized with the binary data from the USAP protocol data unit (PDU) binary data portion. The USAP does not know about the structure of the data that it carries, only information about it (meta data) which is contained. The meta data in this case is also self describing data. There is no dependence between USAP protocol and the object data.

The use of a single consistent internal protocol allows additional subsystems to be easily added to support multiple external protocols. In the illustrated embodiment, the mapping between an external protocol, such as ISUP, is accomplished by the protocol broker component 118.

As a consideration, the USAP can be implemented using a low level communication such as memory-mapped 10 for transporting binary data; i.e., passing a reference to the receiver to improve performance within a machine. For inter-machine communication, an inter-process communication interface or the regular socket interface can be used as intermediate step to transport the meta data using TCP/IP. In this case, the binary data portion of the USAP PDU is populated with a particular object data and the USAP header contains the identity of this object. This mechanism allows the USAP PDU to transport many object data types easily since it is typeless.

The subsystems of the NetworkIP 92 are discussed in greater detail hereinbelow.

The ISUPEngine subsystem resides at the Access Layer of the NetworkIP system to provide ISUP protocol access to signaling network. It includes an ISUPBroker component to adapt/convert between ISUP messages and internal USAP messages (and vice versa), and an ISUPStateMachines component to support the ISUP protocol. The ISUPEngine (a) supports the ANSI ISUP protocol over SS7 MTP, (b) exchanges circuit related managements with the ResourceManager-TrunkManager, (c) exchanges generic call setup information with the BasicCallProcessingEngine, (d) performs adaptation/conversion of the ISUP PDU to internal USAP message format (and vice versa), (e) utilizes a configuration mechanism to initialize its internal operating data such as CIC, Point Codes, Timers, and (f) exchanges timed-out notifications to the BasicCallProcessingEngine.

The ISUPEngine has the following interfaces:
vendor specific APIs or class library to interface to the vendor SS7 MTP subsystem.
USAP interface with the MPUManager where the header is set to Resource Related category.
USAP interface with the BasicCallProcessingEngine where the header is set to Call Setup Related category.

The ISDNEngine subsystem resides at the Access Layer of the NetworkIP system to provide ISDN protocol access to signaling network. It includes an ISDNBroker component to adapt/convert between ISDN messages and internal USAP message (and vice versa) and an ISDNStateMachines component to support the ISDN protocol.

The ISDNEngine (a) supports the ITU-ISDN protocol, (b) exchanges circuit related managements with the ResourceManager-TrunkManager, (c) exchanges generic call setup information with the BasicCallProcessingEngine, (d) performs adaptation/conversion of the ISDN PDU to internal USAP message format (and vice versa), (e) utilizes a configuration mechanism to initialize its internal operating data and (f) exchanges timed-out notifications to the BasicCallProcessingEngine.

The ISDNEngine has the following interfaces:

vendor specific APIs or class library to interface to the vendor ISDN subsystem.

USAP interface with the MPUManager where the header is set to Resource Related category.

USAP interface with the BasicCallProcessingEngine where the header is set to Call Setup Related category.

The MPUAgent subsystem resides the Access Layer of the NetworkIP subsystem and it contains various Media Processors (MPs) to access to the specialized resources. These specialized resources can be listed as announcements, voice recognition devices, DTMF digit collection, audio conference bridge, text-to-speech, and so on.

The MPUAgent (a) executes commands from MPUManager and responds with the results. A sample of commands (not exhausted) can be listed as: play announcement, collect digits or a combination of the above, (b) controls the specialized resources by directing them to provide output and to accept input from the caller, (c) communicates with the MPU Resource Manager using USAP to hide vendor specific APIs, (d) management of circuit control (T1 channels) between the NetworkIP and non-AIN switch 12.

The MPUAgent has the following interfaces:

vendor specific APIs or class library to interface to the vendor subsystem for a particular media.

USAP interface with the MPUManager where the header is set to Resource Related category.

T1 channel interface to non-AIN switch 12.

The BasicCallProcessingEngine subsystem resides in the Service Framework Layer of the NetworkIP system. It includes a FeatureSelectINteractManager component to select which service-features need to be handled by the IP Feature-Manager or by the SCP via BasicIN-IPManager, and the interactions if needed among the service features. This component is designed to be based on the ITU-IN Feature Interaction Manager/Call Manager model as described in the ITU Q.1214. The BasicCallProcessingEngine subsystem further includes a BasicCallManager component to handle the Basic Call State Model for both Originating and Terminating segments. This component is designed to be based on the ITU-IN Basic Call Manager model as described in the ITU Q.1214.

The BasicCallProcessingEngine uses an object oriented Basic Call State Model that is based on the BellCore 1298, AIN 0.2 call model. The Basic Call State Model (BCSM) is a state machine to establish, maintain, and provide connection control the communication paths (both originating and terminating call segments) for users. The BCSM reports the IN events that require the invocation of the IN service logics. Call State exception handling is followed as specified by BellCore 1298 call model. The BasicCallProcessingEngine subsystem selects which service logic instance need to be invoked locally via the NetworkIP application server or the SCP service logic program in order to accomplish a particular service-feature. The selection mechanism is based on the analyzing of the called digits.

Further, the BasicCallProcessingEngine subsystem exchanges generic call setup protocol data units with the Protocol Engine such as ISUPEngine and processes the timed-out notifications that are received from the Protocol Engine such as ISUPEngine. This implies the BasicCallManager does not have any timers associated with the Call Setup Protocol activities in its state machine such as timed-out while waiting on ACM or ANM of the ISUP call.

The BasicCallProcessingEngine subsystem reports IN events to either the BasicIN-IP Manager or the ApplicationFeatureManager. The call context information is exported to either the BasicIN-IP Manager or the ApplicationFeatureManager. It further analyzes and executes the instructions in the received responses from either the BasicIN-IP Manager or the ApplicationFeatureManager.

In addition, BasicCallProcessingEngine subsystem requests the circuit assignment, validation with the ResourceManager-TrunkManager in order to process the basic call, uses a configuration mechanism to initialize its internal operating data and uses asynchronous message processing (non-blocking wait on response). This requires message context information need to be saved for later correlations.

The BasicCallProcessingEngine subsystem has the following interfaces:

an USAP interface to Resource Manager-Trunk Manager. The USAP header indicates the Resource Related category.

an USAP interface to BasicIN-IP Manager. The USAP header indicates the IN-Event Related category.

an USAP interface to ApplicationFeatureManager. The USAP header indicates the IN-Event Related category.

an USAP interface to Protocol Engine such as ISUPEngine. The USAP header indicates the Call Setup Related category a DBMS interface to the DatabaseServer.

The ResourceManager subsystem resides in the Service Framework Layer of the NetworkIP system. It includes a Trunk Manager to manage the circuit, trunk group resources, and an MPUManager to manage the specialized resources such as DTMF digit collection and announcements.

The Resource Manager (a) processes CIC, trunk resource requests from clients by managing the CIC assignment, maintaining the circuit state, and converting back and forth between the trunk span and circuit identifier to CIC (it is stateless since the clients have state machines), (b) supports configuration activities to provision the circuit, trunk, trunk group database, (c) processes specialized resource requests (collect digit, play announcement, text-to-speech, or combination of them) from clients by issuing commands to and obtaining results from MPUAgents (it is stateless since the clients have state machines), (d) managing MPUAgents to allow clients to access to a pool of media resources, (e) performs resource house-keeping (keep track of resource states and generating IPRs and execute appropriate actions if there are errors encounter) for both specialized and regular resources (the regular resources house-keeping functions include processing circuit management messages and maintaining the trunk database), (f) exchanges circuit management activities with the Protocol Engines such as ISUPEngine and (g) uses asynchronous message processing (non-blocking wait on response). This requires message context information need to be saved for later correlations.

The ResourceManager subsystem has the following interfaces:

an USAP interface to BasicCallProcessingEngine. The USAP header indicates the Resource Related category.

an USAP interface to BasicIN-IP Manager. The USAP header indicates the Resource Related category.

an USAP interface to ApplicationFeatureManagers. The USAP header indicates the Resource Related category.

an USAP interface to Protocol Engine (ISUPEngine). The USAP header indicates the Resource Related category.

an USAP interface to MPUAgent. The USAP header indicates the Resource Related category.

a DBMS interface to the DatabaseServer.

The BasicIN-IP Manager subsystem resides in the Service Framework Layer of the NetworkIP system. It includes a SRF StateMachine (SRFSM) component supporting the SRF states to handle the specialized resource activities (this component is designed to be based on the ITU-IN SRF FSM as described in the ITU Q.1218 and ETSI) and a IN-SwitchingManager (INSwMgr) component to interact with SCF in the course of providing IN service features. This component is designed to be based on the ITU-IN Switching Manager model as described in the ITU Q.1214. In addition, the NetworkIP INSwMgr is also designed to be based on ITU-IN SSF FSM as described in the ITU Q.1218 and ETSI. This component is scaled down if the NetworkIP is deployed as a stand-alone IP system; not ISP.

The BasicIN-IP Manager also includes an INAPBroker+TCAPlibrary component to handle INAP protocol on top of TCAP over IPC. This implies the INAPBroker performs adaptation/conversion function to format the INAP protocol to an internal format. Thus, in other designs, other protocol such as AINAP or 1S41 can be plugged in without changing the internal messaging format. This component is designed to be compliant with the ITU-INAP as described in the ITU Q.1218. The INAPBroker+TCAPlibrary component could alternatively be located in the Access layer.

The BasicIN-IP Manager:
(a) commands the specialized resource activities in the course of providing IN service features by using SRF State Machine and by exchanging internal messages with the MPUManager. The error recovery procedure is followed as specified in the ITU-IN SRF FSM and ETSI;
(b) interacts with SCP in the course of providing IN service features by using SSF State Machine in the relaying mode, and by exchanging INAP TCAP transactions that utilize Service Key as appropriate. If the NetworkIP is deployed as a stand-alone IP system (not ISP Service Node), then this function is scaled down to just simply provides the INAP/TCAP transaction interface for the SRF State Machine. The error recovery procedure is followed as specified in the ITU-IN SSF FSM, ETSI, and ANSI TCAP;
(c) serves the ApplicationFeatureManagers needs in accessing SCP service logic database via INAP/TCAP protocol. This requires the BasicIN-IP Manager to manage the TCAP transactions on the behalf of the servers and to support a mechanism to route an internal responded messages back to which server that participates in a given transaction;
(d) exchanges internal generic protocol independent IN events and responses with the BasicCallProcessingEngine-BasicCallManager to direct the BCSM during the course of providing IN service feature;
(e) processes IN events and coordinates with the BasicCallProcessingEngine-FeatureSelectInteractManager to perform feature interactions among the service logic instances;
(f) uses a configuration mechanism to setup the operating mode of the NetworkIP as ISP or IP, and to initialize its internal operating data as well as protocol association such as INAP or MNAP or 1S41 (or other); and
(g) uses asynchronous message processing (non-blocking wait on response). This requires message context information need to be saved for later correlations.

The BasicIN-IP Manager subsystem has the following interfaces:

an USAP interface to Resource Manager-MPU Manager. The USAP header indicates the Resource Related category.

an USAP interface to BasicCallProcessingEngine. The USAP header indicates the IN-Event Related category.

an USAP interface to ApplicationFeatureManager. The USAP header indicates the TCAP Related category.

an INAP/TCAP interface to the SCP.

a DBMS interface to the DatabaseServer.

The DataBaseServer resides in the Service Framework Layer. The DataBaseServer includes a Database Request Broker to handle external requests to the DatabaseServer. This DBMS interface could have an object-oriented interface (such as ROGUEWAVE dbtool++), or standard SQL, or OQL (Object Query Language). The DataBaseServer further includes a Database Transaction Manager to manage the database transactions to ensure data integrity and concurrency among database users and a Database Server Engine to manage the persistent data resources.

The DatabaseServer processes database requests from the clients, performs database transaction management to ensure the data integrity and to resolve dead lock and manages the data resources on the behalf of the clients including failover, back-up, restore, and provisioning.

The DatabaseServer has the following interfaces:
a DBMS interface to ResourceManager
a DBMS interface to ApplicationFeatureManager
a DBMS interface to BasicIN-IP Manager
a DBMS interface to BasicCallProcessingEngine
a DBMS interface to OAM&P Layer.

The Specific Service Feature Manager subsystem resides in the Service Application Layer of the NetworkIP system. The Specific Service Feature Manager subsystem includes a FeatureManager Service Logic State Machine component to support a specific state machine for a particular IP service feature (Debit Card, Voice Mail, Fax Messaging, Short Message, and so on) and a the SRF StateMachine (SRFSM) component supporting the SRF states to handle the specialized resource activities. This component is designed to be based on the ITU-IN SRF FSM as described in the ITU Q.1218.

The Specific Service Feature Manager:
a) commands the specialized resource activities in the course of providing IP specific service features by using SRF State Machine and by exchanging internal messages with the MPUManager. The error recovery procedure is followed as specified in the ITU-IN SRF FSM.
b) interacts with SCP on a needed basis in the course of providing IP specific service features via BasicIN-IPManager subsystem.
c) exchanges internal generic protocol independent IN events and responses with the BasicCallProcessingEngine-BasicCallManager to direct the BCSM during the course of providing IP specific service feature.
d) processes IN events and coordinates with the BasicCallProcessingEngine-FeatureSelectINteractManager to perform feature interactions among the service logic instances. This function is for future iteration.
e) uses a configuration mechanism to initialize its internal operating data.
f) uses asynchronous message processing (non-blocking wait on response). This requires context information (state) need to be saved for later correlations.

The Specific Service Feature Manager subsystem has the following interfaces:

an USAP interface to Resource Manager-MPU Manager. The USAP header indicates the Resource Related category.

an USAP interface to BasicCallProcessingEngine. The USAP header indicates the IN-Event Related category.

an USAP interface to BasicIN-IP Manager. The USAP header indicates the TCAP Related category.

a DBMS interface to the DatabaseServer.

The OAM&P Layer contains subsystems to support the general OAM&P tasks, the craft interface, and the peer NetworkIP interface. The OAM&P Layer supports a GUI (Graphical User Interface) and an OAM&P. The configuration management includes NetworkIP system tables, application tables, trunk tables, operation and measurement tables, and log tables.

The OAM&P has the following interfaces:

craft interface interface with the remote OAM&P Manager.

interface with the peer NetworkIP.

Similar to the embodiment shown in FIGS. 1–5, the overall operation of the embodiment shown in FIGS. 6–10 provides enhanced services to non-AIN switches. The embodiment shown in FIG. 6–10 has the further advantage that is may be used as an IP in a number of different circumstances. Using an internal protocol independent of the external protocol (s) to communicate between subsystems of the NetworkIP allows the device to be easily modified and expanded as circumstances require.

Figure 11:
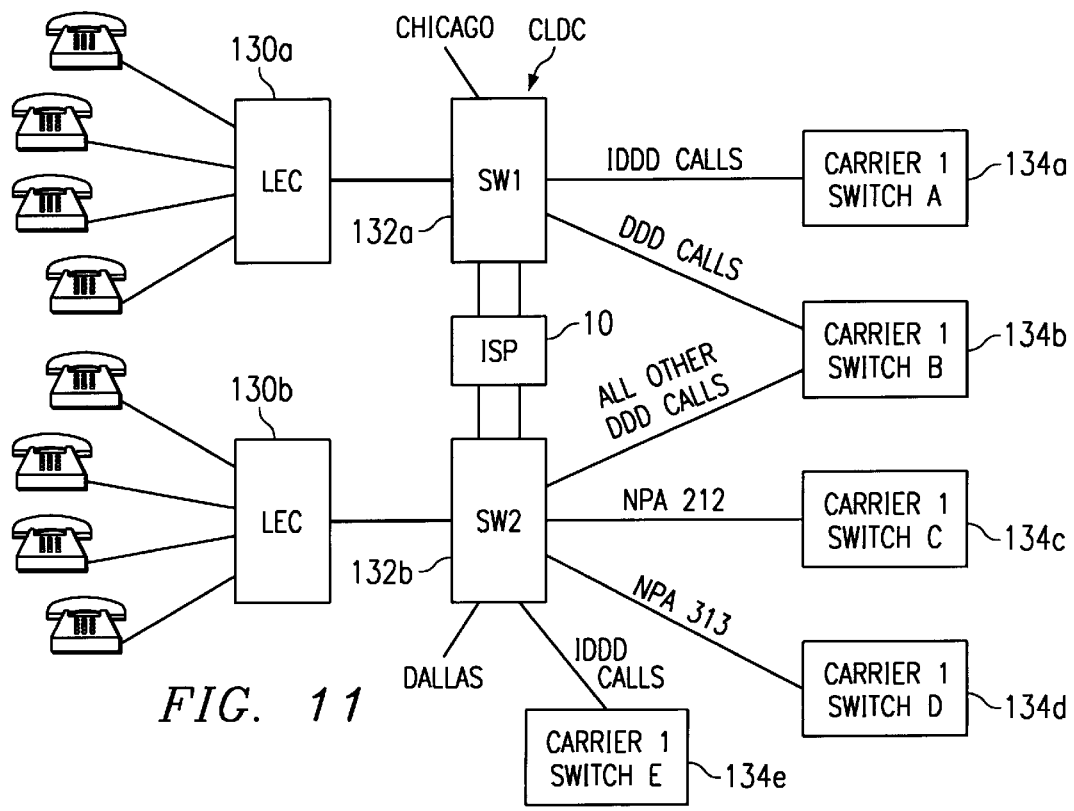
FIG. 11 illustrates an embodiment for advanced long distance routing using an ISP.

FIGS. 11–12 illustrate an ANISR (automatic number identification specific routing) which provides routing based on a user's ANI (or authorization code). The ANISR service could be used by CLDCs (competitive long distance carriers) who provide a point of presence (POP) to other long distance carriers (OCLDCs) on the LEC (local exchange carrier) network. Many CLDCs lease time over their long distance networks to OCLDCs, who lack their own long distance infrastructure.

FIG. 11 illustrates a setup for using ANISR for a specific OCLDC ("Carrier1"). In FIG. 11, LEC switches 130 (individually referenced as 130a and 130b) are coupled home switches 132 (individually referenced as 132a and 132b). Home switches 132a and 132b are coupled to ISP 10 (which could also be ISP/IP 90, or another IP device with similar features). Home switches 132 are coupled to carrier switches 134 (individually referenced as 134a through 134e). In the illustrated embodiment, home switch 132a is coupled to carrier switches 134a and 134b, while home switch 132b is coupled to carrier switches 134b through 134e.

In an actual embodiment, the CLDC may have one or more home switches 132 coupled to the ISP 10. The OCLDCs supported by the CLDC may set up dedicated trunk groups which terminate on the home switches 132. Calls which originate from ANIs or authorization codes subscribing to the OCLDCs are routed over the dedicated trunk groups belonging to the OCLDCs. If there are no dedicated trunk groups for the dialed number, the calls are routed over the CLDC network.

In operation, long distance calls associated with an OCLDCs using the ANISR service are routed by one of the LECs 130 to an associated home switch 132. The SCF of the ISP 10 is accessed to get a route list based on a "CarrierID". The "CarrierID" can be determined through the authorization code or the ANI associated with the call. The SCF, based on the ANI (or authorization code), reads the route list associated with the subscribed CarrierID and returns routing information to the SSF. The SSF routes the call back to the home switch 132 with terminating routing information.

ANISR allows routing information to be dependent upon a number of factors. First, ANISR can support Call Type routing where terminating route lists are based on the type of call, as shown in FIG. 11. The following call types can be supported:

1+ DDD calls (Default route for NPA/NXX routing)

0− Operator calls

0+ Operator assisted calls

011+ IDDD Calls

01+ Operator Assisted IDDD Calls

A second type of routing which may be supported by ANISR is Origin Based routing. This type of routing may be used where an OCLDC has more than one point of presence (POP), i.e., it has terminating routes on more than one home switch 132. In FIG. 11, for example, Carrier1 has two points of presence, since it has terminating routes on two home switches. Using Origin Based routing, the terminating route lists are based upon the home switch accessing the ISP 10 (via the CarrierID), as well as on the type of call.

A third type of routing, Called Number routing, is based upon the first three digits (NPA) or six digits (NPA/NXX) of the called number. The ISP 10 will first search for a route list corresponding to the CarrierID based on the NPA/NXX of the called number. If there is no match on the NPA/NXX, the ISP 10 will then search for a route list corresponding to the CarrierID based on the NPA of the called number. If there is no match on the NPA, the ISP 10 will provide the default route list assigned for 1+ calls in the CarrierID table (described below).

If all trunks are busy in the route list, the home switch give an ATB (all trunks busy) treatment to the call.

Five main tables are used in connection with ANISR, the Authorization Code Services table, the ANI Code Services table, the CarrierID table, the NPA/NXX table and the Route List table. The records for each of these tables are described below.

TABLE I

Authorization Code Services Table

| Field | Type | Comments |
| --- | --- | --- |
| Authorization Code | Numeric | 8 digits |
| AcctCodeLen | Tiny Integer | 2–12 digits |
| AcctCodeID | Small Integer | 2 byte index into Account Code Table |
| OPART | Small Integer | 0–511 |
| TPART | Tiny Integer | 0–15 |
| CarrierID | Small Integer | NULL indicates no ANI based routing |
| Service Type | Tiny Integer | Expanded Account Code |

TABLE II

ANI Services Table

| Field | Type | Comments |
| --- | --- | --- |
| ANI (Key) | Numeric | |
| AcctCodeLen | Tiny Integer | 2–12 digits |
| AcctCodeID | Small Integer | NULL indicates no validation required |
| TPART | Tiny Integer | Mandatory |
| OPART | Small Integer | Required for VPN |

TABLE II-continued

ANI Services Table

| Field | Type | Comments |
|---|---|---|
| CarrierID | Small Integer | NULL indicates no ANI based routing |
| Service Type | Tiny Integer | Expanded Account Code |

TABLE III

Carrier ID Table

| Field | Type | Comments |
|---|---|---|
| Carrier ID | Small Integer | Used as index to table |
| NPA/NXX Routing? | BIT | This flag is used for DDD Calls only.<br>0 = Call Type base routing<br>1 = NPA/NXX based routing |
| Route List Index for 1+ Calls (DDD) | Small Integer | If Null, then route on TPART/OPART (default), else route on Route List Index |
| Route List Index for 0- Calls (Operator) | Small Integer | If Null, then route on TPART/OPART (default), else route on Route List Index |
| Route List Index for 0+ Calls (Operator Assisted) | Small Integer | If Null, then route on TPART/OPART (default), else route on Route List Index |
| Route List Index for 011+ Calls (IDDD) | Small Integer | If Null, then route on TPART/OPART (default), else route on Route List Index |
| Route List Index for 01+ Calls (Operator assisted IDDD) | Small Integer | If Null, then route on TPART/OPART (default), else route on Route List Index |

TABLE IV

NPA/NXX Table

| Field | Type | Comments |
|---|---|---|
| Carrier ID | Small Integer | Used as index to table |
| Digits | 6 character | =NPA/NXX or<br>+NPA |
| Route List Index | Small Integer | If Null, then route on TPART/OPART (default), else route on Route List Index |

TABLE V

Route List Table

| Field | Type | Comments |
|---|---|---|
| Route List Index | Small Integer | Used as index to table |
| TG | Small Integer | Route choice (trunk group) |

Figure 12A:
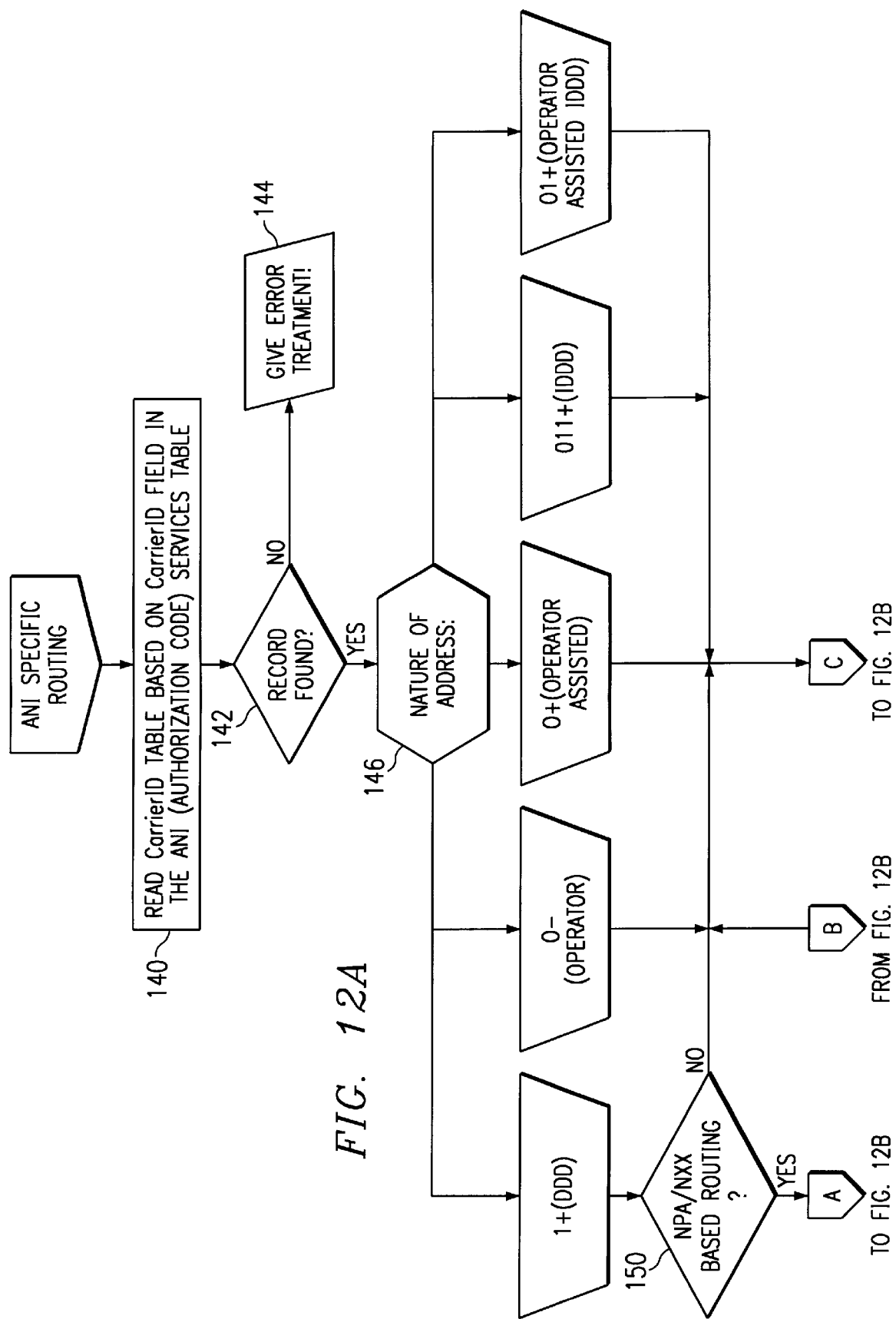
FIGS. 12a and 12b show a flow chart describing a method of long distance routing.
Figure 12B:
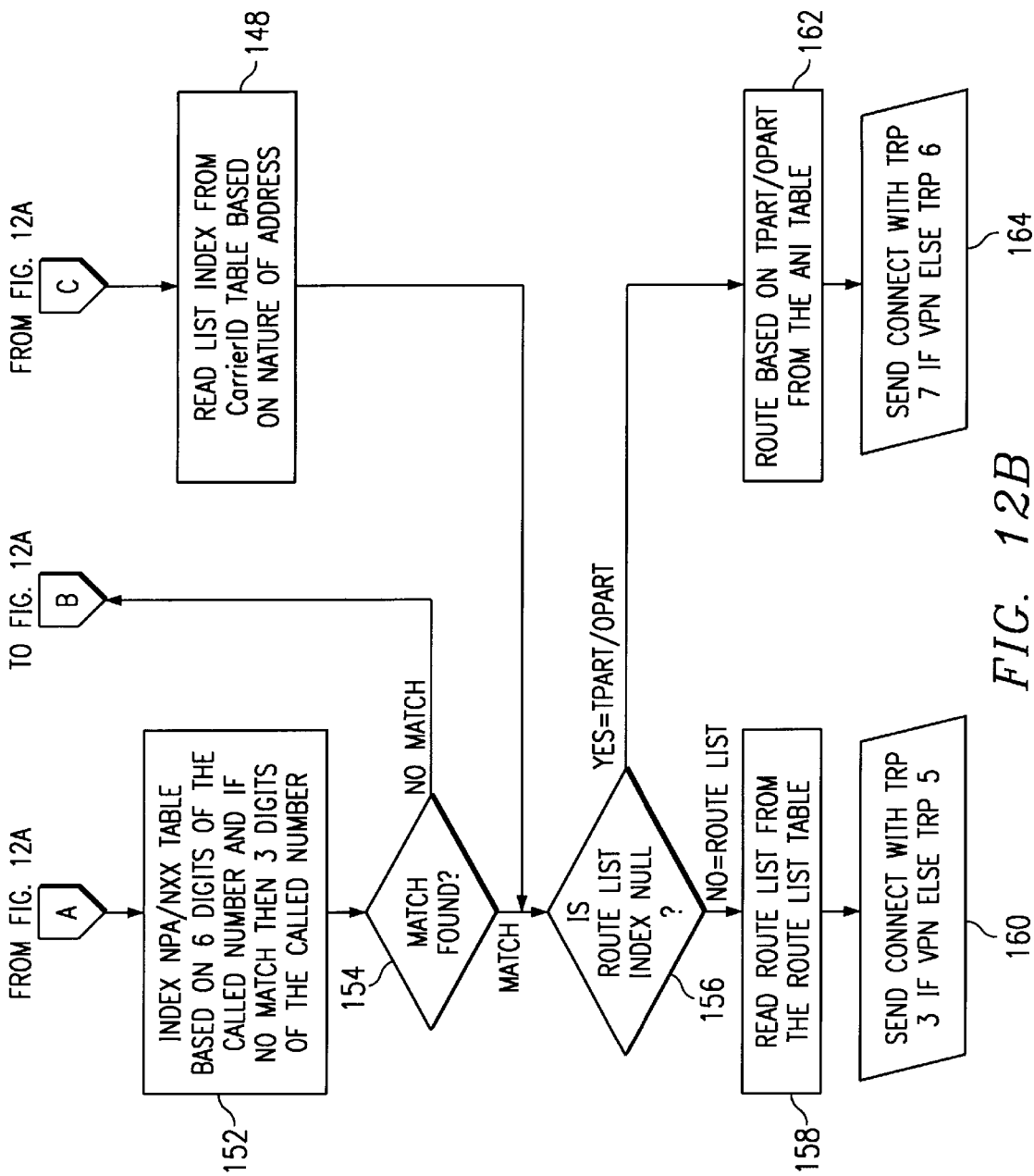

FIGS. 12*a* and 12*b* show a flow chart further describing operation of ANISR. In block 140, a call requiring ANISR is routed to the ISP 10 over a home switch 132. The ISP determines the CarrierID in block 140 by accessing the Authorization Code Table at the record corresponding to the authorization code of the calling party (assuming there is an authorization code) and then, if there is no match, accessing the ANI Services Table at the ANI of the calling party. If a CarrierID cannot be determined from either table in decision block 142, error treatment is performed in block 144. Otherwise, the call type is determined in block 146. If the call type is other than 1+ (DDD), or if the call type is 1+ (DDD) but NPA/NXX routing is disabled for the associated CarrierID (determined by accessing the CarrierID table at the CarrierID determined in block 140) in the Carrier1D table, then the Route List Index for that call type is read from the corresponding field of the CarrierID Table for that call type in block 148.

If the call type is 1+ (DDD) and NPA/NXX is enabled for the associated CarrierID in the CarrierID table in decision block 150, then the NPA/NXX Table is accessed responsive to the appropriate CarrierID and the first six digits of the called number in block 152. If no match is found, then the NPA/NXX Table is accessed responsive to the appropriate CarrierID and the first three digits of the called number. If a match is found in decision block 154, then the Route List Index is obtained from that record of the NPA/NXX Table. If no match is found to either the six digit or the three digit field, then the Route List Index for 1+ (DDD) calls is read from the CarrierID Table in block 148.

After the Route List Index is obtained, either from the CarrierID table or the NPA/NXX Table, the terminating route list is obtained from the Route List Table in block 158, if the Route List Index is not NULL in decision block 156. In block 160, the ISP returns a CONNECT with TRP (termination route package) 3 if VPN (virtual private network), else TRP 5, requesting the home switch to route the call based on the terminating route list accessed in block 158.

If the Route List Index is NULL in block 156, the terminating route list is based on the TPART/OPART of the ANI and the called number in block 162. In block 164, a CONNECT is sent from the ISP 10 to the home switch 132 with TRP 7 for VPN or TRP 6 otherwise.

In addition to the services described above, ANISR could be further enhanced to offer other services. For example, call screening could be offered to customers where, based on the ANI (or authorization code), certain numbers or groups of numbers could be made inaccessible. Such a feature could use a table linked to the ANI and Authorization Code Service tables to lookup a number prior to forming a connection.

Time of day routing could be used to route calls differently based on the time of day for certain ANIs or authorization codes.

A virtual private network (VPN), in addition to the VPN capabilities of the home switch, could be used to offer specific plans to companies, allowing enhanced features such as short dialing between sites.

ANISR provides significant advantages to long distance carriers, because it expands the capability of the switch to use different routes for different customers beyond that which would be available using the TPART of a home switch, which limits the routing options. With the addition of the ISP, the options for routing, or screening, are virtually unlimited. ANISR provides the capability to perform routing (or screening) responsive to ANI/authorization code, call type, incoming trunk, time, destination or carrier. OCLDCs which have a partial infrastructure can benefit from enhanced services through another provider. Enhancements to the services can be made easily by the provider using an SCE (service creation environment).

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims

What is claimed is:

1. An electronic device for providing enhanced telecommunication functions, comprising:

circuitry for providing a switching service function communicating with external devices and translating externally received signals into an independent internal protocol;

circuitry for providing specialized resource functions coupled to said circuitry for providing said switching service function in a single physical device; and circuitry for selectively coupling said circuitry for providing a switching service function with an internal service control function in said single physical device or to an external service control peripheral.

2. The electronic device of claim 1 wherein said circuitry for providing a switching service function comprises circuitry for translating a plurality of protocols from external devices into said internal protocol.

3. The electronic device of claim 2 wherein said circuitry for providing a switching service function includes circuitry for coupling to one or more external switches.

4. The electronic device of claim 3 wherein said circuitry for providing a switching service function further includes circuitry for receiving ISUP signals from said one or more external switches and translating said ISUP signals into said independent internal protocol.

5. The electronic device of claim 1 wherein said circuitry for providing a switching service function include circuitry for controlling said circuitry for providing said specialized resource functions.

6. The electronic device of claim 2 wherein said circuitry for providing a switching service function includes circuitry for coupling to one or more AIN switches.

7. The electronic device of claim 2 wherein said circuitry for providing a switching service function includes circuitry for coupling to one or more wireless communication switches.

8. A method for providing enhanced telecommunication functions, comprising the steps of:

providing a switching service function communicating with external devices and translating externally received signals into an independent internal protocol;

providing specialized resource functions in a single physical device with said switching service function; and selectively coupling said switching service function with an internal service control function in said single physical device or to an external service control peripheral.

9. The method of claim 8 wherein said step of providing a switching service function comprises translating a plurality of protocols from external devices into said internal protocol.

10. The method of claim 9 wherein said step of providing a switching service function includes the step of communicating with one or more external switches.

11. The method of claim 10 wherein said step of providing a switching service function further includes the step of receiving ISUP signals from said one or more external switches and translating said ISUP signals into said independent internal protocol.

12. The method of claim 8 wherein said step of providing a switching service function include the step of controlling said specialized resource functions.

13. The method of claim 9 wherein said step of providing a switching service function includes the step of communicating with one or more AIN switches.

14. The method of claim 9 wherein said step of providing a switching service function includes the step of communicating with one or more wireless communication switches.

15. A telecommunications system comprising:

a plurality of switches; and an electronic device comprising:

circuitry for providing a switching service function communicating with said switches and translating externally received signals from said switches into an independent internal protocol;

circuitry for providing specialized resource functions in a single physical device with said circuitry for providing said switching service function; and circuitry for selectively coupling said switching service function with an internal service control function in said single physical device or to an external service control peripheral.

16. The telecommunications system of claim 15 wherein said plurality of switches include one or more non-AIN switches.

17. The telecommunications system of claim 15 wherein said plurality of switches include one or more AIN switches.

18. The telecommunications system of claim 15 wherein said plurality of switches include one or more wireless switches.

* * * * *